Oct. 29, 1957 E. J. OTTO 2,811,376
MEANS FOR MOVING A SLEEVE INTO AND OUT OF POWER
TRANSMITTING ENGAGEMENT WITH A BUSHING
Filed Dec. 29, 1953

Inventor
Eugene J. Otto
by Egon W. Mueller
Attorney

United States Patent Office 2,811,376
Patented Oct. 29, 1957

2,811,376

MEANS FOR MOVING A SLEEVE INTO AND OUT OF POWER TRANSMITTING ENGAGEMENT WITH A BUSHING

Eugene J. Otto, Milwaukee, Wis., assignor to Allis-Chalmers Manufacturing Company, Milwaukee, Wis.

Application December 29, 1953, Serial No. 400,978

1 Claim. (Cl. 287—52.09)

This invention relates generally to means for moving a bushing into and out of power transmitting engagement with a sleeve.

Sheave makers are constantly striving for better and and simpler designs of sheave mounting structures. The industry is highly competitive and marginal savings due to simplification of sheave mounting structures is a substantial sales advantage. Shafts and sheave disks have standard but unequal dimensions for the various different sheave sizes. It is therefore necessary to build a mounting and actuating structure which will fit between the shaft and the sheave disk to permit mounting of the sheave disk on the shaft and provide for actuating of the mounting structure to place the sheave disk in power transmitting engagement with the shaft. Bushing and sleeve arrangements used for mounting structures, as such are old, however, there is a constant search by sheave makers for a more trouble free and simpler means for actuating the bushing into and out of power transmitting engagement with a sleeve.

An object of this invention is to provide a simple operating and trouble free means for moving a bushing into and out of power transmitting engagement with a sleeve.

Another object of this invention is to provide means for actuating a bushing into and out of power transmitting engagement with a sleeve which is inexpensive to manufacture and simple to assemble.

The preferred embodiment of the invention is illustrated in the drawings wherein.

Figure 1:
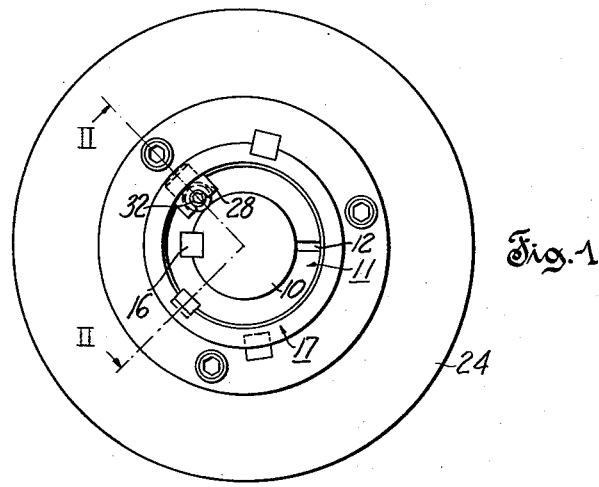
Fig. 1 is an end view of a sheave assembly showing the preferred embodiment of the invention.
Figure 2:
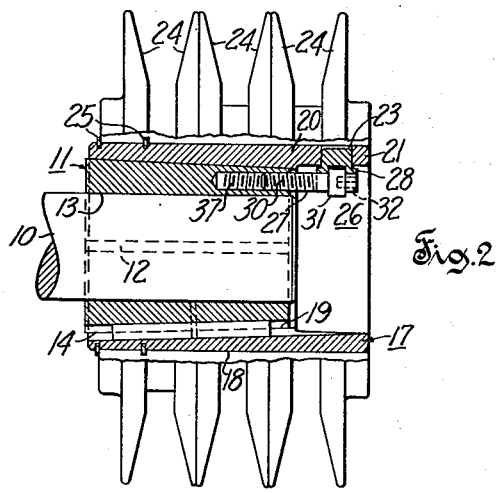
Fig. 2 is a view partly in section and partly in elevation taken along line II—II in Fig. 1.
Figure 3:
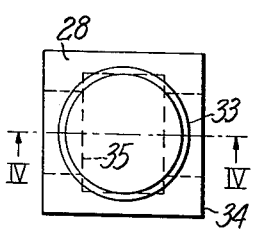
Fig. 3 is a plan view of the sleeve retaining means shown in Fig. 2.
Figure 4:
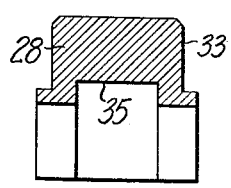
Fig. 4 is a view in section taken along line IV—IV of Fig. 3.
Figure 5:
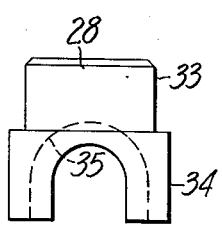
Fig. 5 is a frontal view of the retaining means.

As shown in Figs. 1 and 2 of the drawings, a shaft 10, a segment of which is shown, has coaxially disposed thereon an axially split bushing 11. The axial split 12 of the bushing 11 permits the bushing 11 to be contracted about the shaft 10.

Bushing 11 has an inner shaft engaging surface 13 which grips the shaft 10 in power transmitting engagement. The bushing 11 also presents an outer tapered surface 14. The bushing 11 is keyed to the shaft by a key 16.

Coaxially disposed adjacent the outer tapered surface 14 is a sleeve 17 which has an outer surface 18 and an inner tapered surface 19 complementary to and engaging the outer tapered surface 14. Adjacent the enlarged tapered end 20 of the sleeve 17 is a nontapered end 21 of the sleeve 17 extending to the extremity of the sleeve 17. The sleeve 17 presents a perforation 23 in the nontapered end 21.

Sets of oppositely facing sheave disks 24 are disposed on the outer surface 18 coaxial with the sleeve 17. These disks 24 are affixed against axial movement by snap rings 25 recessed in the outer surface 18.

The bushing 11 is wedged into power transmitting engagement with the sleeve 17 and the shaft 10 by a means 26 for moving the bushing into and out of power transmitting engagement with the shaft 10 and the sleeve 17. Means 26 includes a bolt 27 and a retaining means 28. The bolt 27 has a thread 30 adjacent one of its extremities and a head 31 which may have any suitable configuration and is shown as a cylindrical cap head 31 with a hexagonal adjusting recess 32. The retaining means 28 has a first portion 33 and a second portion 34. The first portion 33 may have any suitable external surface configuration and is shown as cylindrical. The first portion 33 is seated in the perforation 23 of the sleeve 17. The second portion 34 which extends radially inward in the sleeve defines a cavity 35 which is complementary in configuration to the head 31.

The retaining means 28 may be made according to any suitable manufacture but is preferably made of steel and cyanide hardened after machining. The hardening process aids materially in adding to the strength of the retaining means 28 and in preventing excessive wear as a result of repeated adjustments of the bolt 27.

The means 26 is contained and assembled in the wall of the sleeve 17 and bushing 11 between the inner shaft engaging surface 13 of the bushing 11 and the outer surface 18 mounting the disks 24. Means shown as an internal threaded section 37 in the bushing 11 are presented by the bushing 11 for engaging the thread 30 of the bolt 27.

To assemble the structure, the bushing 11 is slipped on the shaft 10 and the sleeve 17 mounting the sheave disks 24 is started on the bushing 11. The retaining means 28 is seated in the perforation 23 and the head 31 of the bolt 27 is disposed in the cavity 35 of the retaining means 28. The sleeve 17 is then advanced onto the bushing 11 until the thread 30 of the bolt 27 threadingly engages the internal threaded section 37 presented by the bushing 11. A suitable wrench can be utilized to engage the hexagonal adjusting recess 32 of the head 31 to advance the thread 30 into further engagement with the internal threaded section 37. The advance continues until the bushing 11 and sleeve 17 are in power transmitting engagement. Disengagement is effected by reversal of the stated advance procedure.

Although the preferred embodiment of the device has been described it should be understood that within the scope of this invention various changes may be made in form, details, proportion and arrangement of parts, the combination thereof and mode of operation which generally stated consist of a device capable of carrying out the objects set forth as disclosed and defined in the appended claim.

It is claimed and desired to secure by Letters Patent:

In a demountable sheave unit, the combination comprising: an axially split bushing adapted to be contracted about a shaft, said bushing having an inner shaft engaging surface and an outer tapered surface, a sleeve having a cylindrical outer sheave receiving surface and an inner tapered surface complementary to said outer tapered surface, said sleeve having a perforation at one of its extremities, said sleeve being coaxially disposed on said bushing with said inner surface of said sleeve engaging said outer surface of said bushing, and means for moving said bushing into and out of power transmitting engagement with said sleeve comprising a bolt having a thread adjacent one of its extremities and a head adjacent the other of its extremities, a retaining member having a first portion extending into said perforation of said sleeve and a second portion extending inside of said sleeve and defining a cavity complementary of said head, said bushing defining a threaded opening for threadingly engaging said thread of said bolt while locating said head of said bolt in said cavity of said retaining means to cause engagement and disengagement of said bolt and said bushing for moving said sleeve into and out of power transmitting engagement with said bushing.

References Cited in the file of this patent

UNITED STATES PATENTS

| | | |
|---|---|---|
| 525,775 | Wainwright | Sept. 11, 1894 |
| 1,694,140 | O'Neill | Dec. 4, 1928 |
| 2,648,988 | Knudsen | Aug. 18, 1933 |
| 2,399,396 | Silver | Apr. 30, 1946 |
| 2,467,819 | Firth | Apr. 19, 1949 |
| 2,570,604 | Seigerist | Oct. 9, 1951 |

FOREIGN PATENTS

| | | |
|---|---|---|
| 250,042 | Switzerland | of 1948 |